(12) United States Patent
Yamanaka (10) Patent No.: US 7,669,691 B2
(45) Date of Patent: Mar. 2, 2010

(54) STEERING DEVICE FOR VEHICLE

(75) Inventor: Kosuke Yamanaka, Kashihara (JP)

(73) Assignee: JTEKT Corporation, Osaka-shi (JP)

( * ) Notice: Subject to any disclaimer, the term of this patent is extended or adjusted under 35 U.S.C. 154(b) by 134 days.

(21) Appl. No.: 11/852,594

(22) Filed: Sep. 10, 2007

(65) Prior Publication Data

US 2008/0073143 A1    Mar. 27, 2008

(30) Foreign Application Priority Data

Sep. 25, 2006    (JP) .............................. 2006-259443

(51) Int. Cl.
*B62D 1/00* (2006.01)
(52) U.S. Cl. ...................... 180/446; 180/404
(58) Field of Classification Search ................. 180/446, 180/404, 400, 410, 421; 74/530, 527
See application file for complete search history.

(56) References Cited

U.S. PATENT DOCUMENTS

| | | | | |
|---|---|---|---|---|
| 6,896,090 B2 * | 5/2005 | Kanda et al. | ................ | 180/402 |
| 6,904,999 B2 * | 6/2005 | Kojo et al. | ................... | 180/422 |
| 2004/0070189 A1 * | 4/2004 | Nakatsu et al. | ............. | 280/771 |
| 2005/0037884 A1 * | 2/2005 | Hermann et al. | .............. | 475/18 |

FOREIGN PATENT DOCUMENTS

| | | |
|---|---|---|
| EP | 1 375 294 A2 | 1/2004 |
| EP | 1 674 760 A2 | 6/2006 |
| JP | 2005-53446 | 3/2005 |

\* cited by examiner

*Primary Examiner*—Lesley Morris
*Assistant Examiner*—Levon Fiore
(74) *Attorney, Agent, or Firm*—Oblon, Spivak, McClelland, Maier & Neustadt, L.L.P.

(57) ABSTRACT

A steering device for a vehicle includes a planet gear mechanism which can vary transmission ratio, and a lock mechanism for fixing the transmission ratio. The planet gear mechanism includes a first sun gear connected to a steering member, a second sun gear connected to turning wheels, a planet gear which is meshed with both the first and second sun gears and a carrier in an annular shape which supports the planet gear. The lock mechanism includes a restraining member which is engageable with the carrier thereby to restrain rotation of the carrier.

8 Claims, 7 Drawing Sheets

STEERING DEVICE FOR VEHICLE

BACKGROUND OF THE INVENTION

1. Field of the Invention

The present invention relates to a steering device for a vehicle in which transmission ratio between a steering angle of a steering member and a turning angle of turning wheels can be varied.

2. Related Art

As the steering device for a vehicle as described above, a structure including a first shaft connected to a steering wheel, a second shaft connected to vehicle wheels, and a steering device with variable transmission ratio which interconnects the first shaft and the second shaft has been known (Reference should be made to Japanese Patent Publication No. JP-A-2005-53446, for example). In JP-A-2005-53446, the steering device with the variable transmission ratio is provided with a wavy motion gear mechanism.

As the steering device with the variable transmission ratio, a structure employing a planet gear mechanism, in place of the above described structure including the wavy motion gear mechanism, is taken into consideration. Specifically, it is considered to employ the planet gear mechanism which includes, for example, a first sun gear fixed to the first shaft, a second sun gear fixed to the second shaft, a plurality of pinions arranged around the first and second shafts, and a carrier in an annular shape for supporting the pinions.

Rotation of a steering member is transmitted to the first shaft, the first sun gear, the pinions, the second sun gear, and the second shaft, in this order, and finally transmitted to the vehicle wheels. In this case, when the carrier is actuated by applying torque to the carrier from an electric motor by way of a speed reducing gear mechanism, ratio between rotation numbers (change gear ratio) of the first sun gear and the second sun gear can be varied. In this manner, the transmission ratio is varied.

In the above described structure, when an abnormal condition such as breakdown of the electric motor has occurred, it becomes impossible to control the transmission ratio. In such a case, it is possible to fix the carrier by locking gears of the speed reducing gear mechanism, thereby to fix the change gear ratio constant and to fix the transmission ratio constant.

By the way, the inventor of this application has come to an idea, as the result of his keen researches, that the carrier is rotated using the electric motor of a so-called coaxial type. Specifically, by arranging a rotor and stator of the electric motor coaxially with the steering shaft, output rotation of the rotor is transmitted to the carrier without interposing the speed reducing mechanism.

However, in case where the electric motor of the coaxial type is used, the speed reducing mechanism is not employed, and the transmission ratio cannot be fixed by locking the speed reducing gears.

SUMMARY OF THE INVENTION

The invention has been made under the above described circumstances, and it is an object of the invention to provide a steering device for a vehicle in which transmission ratio can be fixed constant, in a structure where a speed reducing mechanism is not provided between a transmission ratio variable mechanism and an electric motor for varying the transmission ratio.

In order to attain the above described object, there is provided, according to the invention, a steering device for a vehicle (1) including a transmission ratio variable mechanism (17) which can vary transmission ratio ($\theta 2/\theta 1$) between a steering angle ($\theta 1$) of a steering member (2) and a turning angle ($\theta 2$) of turning wheels (4L, 4R), an electric motor (18) including a rotor (18a) which can rotate integrally with a determined element (22) in an annular shape of the transmission ratio variable mechanism (17), and provided for varying the transmission ratio ($\theta 2/\theta 1$), and a lock mechanism for fixing the transmission ratio ($\theta 2/\theta 1$) when an abnormal condition has occurred, characterized in that the lock mechanism includes a restraining member (31) which is engageable with the determined element (22) or an annular member (60) which is integrally rotated with the determined element (22), whereby rotation of the determined element (22) can be restrained.

It is to be noted that numerals and signs in the parentheses represent corresponding constituent elements in an embodiment which will be described below. The same goes for description in the following columns.

According to the invention, in the structure having no speed reducing mechanism between the electric motor and the transmission ratio variable mechanism, it is possible to fix the transmission ratio under abnormal conditions, by restraining rotation of the determined element or so of the transmission ratio variable mechanism. Moreover, because the restraining member restrains the rotation of the determined element or so which is integrally rotated with the rotor having a small transmission torque in spite of high speed rotation, a force required for the restraint can be made smaller. As the results, it is possible to reduce the load applied to the restraining member for fixing the transmission ratio, and the restraining member can be made compact. Further, in the transmission ratio variable mechanism, the determined element or so which rotates at high speed can be formed relatively larger in diameter. Therefore, it is possible to provide a number of rotation positions in which the restraining member is engageable with the determined element or so, during one rotation of the determined element or so. As the results, it is possible to fix the transmission ratio with high responding ability, when an abnormal condition has occurred.

In this invention, the transmission ratio variable mechanism (17) includes a first sun gear (19) connected to the steering member (2), a second sun gear (20) having an axis (L) corresponding to an axis (L) of the first sun gear (19) and connected to the turning wheels (4L, 4R), a planet gear (21) which is meshed with both the first and second sun gears (19, 20), and a carrier (22) in an annular shape which supports the planet gear (21) so as to rotate on its own axis and so as to revolve around the axis (L) of the first and second sun gears (19, 20) integrally, and it is preferable that the determined element (22) includes the carrier (22).

In this case, it is possible to vary the transmission ratio, by rotating the rotor and the carrier at high speed with the rotation number as large as ten times of the rotation number of the first sun gear, for example. When the transmission ratio is fixed by the restraining member, the restraining member restrains the rotation of the carrier which is integrally rotated with the rotor which rotates at high speed and bears a small load. Therefore, the load applied to the restraining member can be made smaller, and hence, the restraining member can be made compact.

Further, in this invention, it is preferable that the lock mechanism includes an actuator (32) which can displace the restraining member (31) between an engaged position (D1) in which the restraining member is engaged with the determined element (22) or the annular member (60) and a disengaged position (D2) in which the engagement is released. In this case, it is possible to restrain the rotation of the determined element, by moving the restraining member from the disengaged position to the engaged position.

Moreover, in this invention, it is preferable that the determined element (22) or the annular member (60) is provided with a recess (61) which is formed on an outer peripheral face (60a) thereof and is engageable with the restraining member (31). In this case, the restraining member can be reliably engaged so that the determined element or the annular member may not move with respect to the restraining member.

Further, it is preferable that a plurality of the recesses (61) are arranged at equal intervals in a circumferential direction (C) on the outer peripheral face (60a) of the determined element (22) or the annular member (60). In case where the determined element rotates, the number of times when the recesses are opposed to the restraining member can be increased. As the results, when the restraining member is engaged with the recesses, a time lag until they start to be engaged can be shortened.

DETAILED DESCRIPTION OF THE PREFERRED EMBODIMENTS

A preferred embodiment according to the invention will be described referring to the attached drawings.

Figure 1:
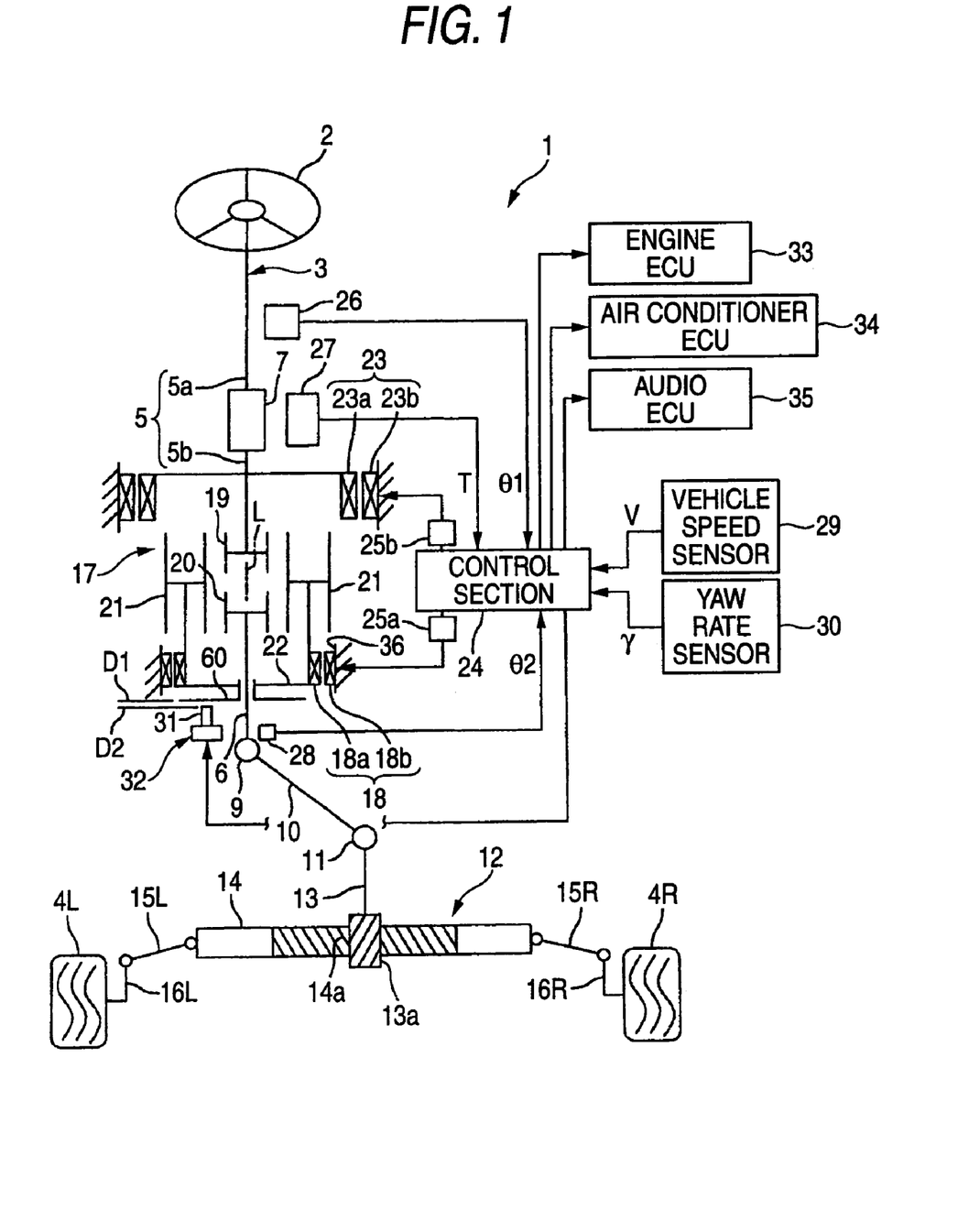
FIG. 1 is a schematic view showing a general structure of a steering device for a vehicle in an embodiment according to the invention.

FIG. 1 is a schematic view showing a general structure of a steering device 1 for a vehicle in an embodiment according to the invention. Referring to FIG. 1, in the steering device 1 for a vehicle, a steering torque applied to a steering member 2 such as a steering wheel is transmitted to left and right turning wheels 4L, 4R by way of a steering shaft 3 as a steering shaft, whereby turning operation is conducted. The steering device 1 has a function capable of varying a transmission ratio $\theta 2/\theta 1$ between a steering angle $\theta 1$ (rotation angle) of the steering member 2 and a turning angle $\theta 2$ of the turning wheels.

This steering device 1 for a vehicle has the steering member 2, and the steering shaft 3 which is the steering shaft connected to the steering member 2. The steering shaft 3 has a first shaft 5 as a first part, and a second shaft 6 as a second part which is arranged on the same axis L as the first shaft 5.

The first shaft 5 has an input shaft 5a connected to the steering member 2, and an output shaft 5b which is connected to the input shaft 5a by way of a torsion bar 7 so that relative rotation between them can be made. Because an allowable value of the relative rotation of the input shaft 5a and the output shaft 5b by way of the torsion bar 7 is very small, it can be considered that the input shaft 5a and the output shaft 5b are rotated substantially integrally.

A planet gear mechanism 17 as a transmission ratio variable mechanism is provided between the output shaft 5b of the first shaft 5 and the second shaft 6, so that change gear ratio between the output shaft 5b and the second shaft 6 can be varied. By varying this change gear ratio, the transmission ratio $\theta 2/\theta 1$ is varied. The second shaft 6 is connected to the turning wheels 4L, 4R by way of a universal joint 9, an intermediate shaft 10, a universal joint 11, and a turning mechanism 12.

The turning mechanism 12 includes a pinion shaft 13 connected to the universal joint 11, a rack shaft 14, as a turning shaft, having a rack 14a meshed with a pinion 13a at a distal end of the pinion shaft 13 and extending in a lateral direction of the vehicle, and knuckle arms 16R, 16L which are respectively connected to opposite ends of the rack shaft 14 by way of tie rods 15R, 15L.

According to the above described structure, the steering torque from the steering member 2 is transmitted to the turning mechanism 12 by way of the first shaft 5, the planet gear mechanism 17, the second shaft 6 and so on. In the turning mechanism 12, rotation of the pinion 13a is converted to axial movement of the rack shaft 14, whereby the knuckle arms 16R, 16L are respectively rotated by way of the tie rods 15R, 15L. In this manner, the corresponding turning wheels 4R, 4L connected to the knuckle arms 16R, 16L are respectively turned.

The planet gear mechanism 17 connects the output shaft 5b of the first shaft 5 to the second shaft 6 so that differential rotation can be made, and actuated by a motor 18 for the planet gear mechanism as an electric motor, whereby the transmission ratio $\theta 2/\theta 1$ is varied.

The planet gear mechanism 17 includes a first sun gear 19, as a first element, which is arranged on the same axis L to be integrally rotated with the output shaft 5b of the first shaft 5, a second sun gear 20, as a second element, which is arranged on the same axis L as the first sun gear 19 to be integrally rotated with the second shaft 6, a planet gear 21, as a third element, which is meshed with both the first and second sun gears 19, 20, and a carrier 22, as a determined element in an annular shape, which supports the planet gear 21 so as to rotate on its own axis, and so as to integrally revolve around the axis L of the first and second sun gears 19, 20.

The first and second sun gears 19, 20 and the planet gear 21 are respectively provided as rotation transmitting elements, and formed of helical gears, for example. It is also possible to employ other gears having parallel axes such as spur gears in place of the helical gears.

The planet gear 21 is provided for making the first and second sun gears 19, 20 associated with each other. A plurality of (two, in this embodiment) the planet gears 21 are arranged in a circumferential direction of the steering shaft 3. The planet gears 21 extend in parallel with the axis L of the steering shaft 3 and are respectively meshed with the first and second sun gears 19, 20, so as to revolve around the axis L.

The planet gear 21 has the same number of teeth both in a part meshed with the first sun gear 19 and a part meshed with the second sun gear 20. The first sun gear 19 and the second sun gear 20 are different from each other in the number of teeth. At least one of the first sun gear 19 and the second sun gear 20 (the second sun gear 20, for example) is formed by employing a profile shifted gear. This profile shifted gear is shifted in a direction where a diameter of a pitch circle becomes smaller or in a direction where it becomes larger.

The motor 18 for the planet gear mechanism is provided for driving the carrier 22 to rotate. By varying the number of rotation of the carrier 22 around the axis L, the change gear ratio between the first sun gear 19 and the second sun gear 20 is varied, whereby the transmission ratio $\theta 2/\theta 1$ is varied.

This motor 18 for the planet gear mechanism is formed of, for example, a brushless motor which is coaxially arranged with the steering shaft 3, and includes a rotor 18a which is fixed to the carrier 22 so as to integrally rotate therewith, and a stator 18b surrounding this rotor 18a which is fixed to a housing 36. The motor 18 for the planet gear mechanism transmits a driving power to the carrier 22, without interposing the speed reducing mechanism.

The steering device 1 for a vehicle is provided with a reaction force compensating motor 23 for compensating steering reaction force of the steering member 2 in association with the motion of the planet gear mechanism 17. The reaction force compensating motor 23 is formed of, for example, a brushless motor which is coaxially arranged with the steering shaft 3, and includes a rotor 23a which is fixed to the output shaft 5b of the first shaft 5 so as to integrally rotate therewith, and a stator 23b surrounding this rotor 23a which is fixed to the housing 36.

The motor 18 for the planet gear mechanism and the reaction force compensating motor 23 are controlled by a control section 24 including a CPU, RAM, and ROM. The control section 24 is connected to the motor 18 for the planet gear mechanism by way of a drive circuit 25a, and connected to the reaction force compensating motor 23 by way of a drive circuit 25b.

Moreover, a steering angle sensor 26, a torque sensor 27, a turning angle sensor 28, a vehicle speed sensor 29, and a yaw rate sensor 30 are respectively connected to the control section 24.

From the steering angle sensor 26, a signal concerning a rotation angle of the input shaft 5a of the first shaft 5, as a value corresponding to the steering angle $\theta1$ which is an amount of operation of the steering member 2 from a neutral steering position is inputted. From the torque sensor 27, a signal concerning a transmitted torque in the first shaft 5, as a value corresponding to a steering torque T of the steering member 2 is inputted. From the turning angle sensor 28, a signal concerning a rotation angle of the second shaft 6, as a value corresponding to the turning angle $\theta2$ is inputted. From the vehicle speed sensor 29, a signal concerning a vehicle speed V is inputted. From the yaw rate sensor 30, a signal concerning a yaw rate $\gamma$ of the vehicle is inputted.

The control section 24 controls motions of the motor 18 for the planet gear mechanism and the reaction force compensating motor 23, according to the signals inputted from the aforesaid sensors 26 to 30.

In association with the planet gear mechanism 17, there is provided a lock mechanism for fixing the transmission ratio $\theta1/\theta2$ when an abnormal condition has occurred.

The "abnormal condition" means, for example, that the signal from either of the aforesaid sensors 26 to 30 is interrupted, or that the carrier 22 is unable to be driven due to breakdown of the motor 18 for the planet gear mechanism.

This embodiment is characterized in that the lock mechanism includes a restraining member 31 which is engageable with a ring member 60, as an annular member integrally rotated with the carrier 22 thereby to restrain the rotation of the carrier 22.

The restraining member 31 is displaced between an engaged position D1 and a disengaged position D2, by means of an electromagnetic solenoid 32. The engaged position D1 is a position in which the restraining member 31 is engaged with the ring member 60 to restrain the rotation of the ring member 60, and the disengaged position D2 is a position in which the restraining member 31 is not engaged with the ring member 60, and the rotation of the ring member 60 is not restrained by the restraining member 31.

The electromagnetic solenoid 32 is actuated and controlled by the control section 24. When the control section 24 has detected occurrence of an abnormal condition, as described above, the control section 24 actuates the electromagnetic solenoid 32 to displace the restraining member 31 to the engaged position D1. In this manner, the rotations of the ring member 60 and the carrier 22 are restrained, whereby revolutions of the planet gears 21 around the axis L are restrained.

Because the revolutions of the planet gears 21 are restrained, transmission of the torques between the first and second sun gears 19, 20 by way of the planet gears 21 at a constant change gear ratio becomes possible, and the transmission ratio $\theta2/\theta1$ can be fixed at a constant value. It is to be noted that the restraining member 31 is located at the disengaged position D2 under normal conditions which are not abnormal conditions.

As described above, even under abnormal conditions, steering operation by the steering member 2 can be performed, because the transmission ratio $\theta2/\theta1$ is fixed at a constant value. On this occasion, there is such anxiety that a driver may keep on driving the vehicle, without repairing the breakdown immediately. Therefore, repair expediting means for recommending the driver to repair is provided in this embodiment.

Specifically, the control section 24 is connected respectively to an engine ECU 33, an air conditioner ECU 34, and an audio ECU 35 as abnormal alarming objects, and adapted to send abnormal alarming signals to the ECUs 33 to 35 under abnormal conditions.

Each of the ECUs 33 to 35 which has received the abnormal alarming signal restrains the motion of the object to be controlled. For example, the engine ECU 33 restrains drive of the engine so that the vehicle speed V may not exceed a determined speed (for example, 50 km/h), the air conditioner ECU 34 restrains drive of an air conditioning unit so that room temperature cannot be adjusted, and the audio ECU 35 restrains drive of an audio unit so that a radio or the like cannot be operated. Moreover, drive of the reaction force compensating motor 23 is restrained so that steering reaction force acting on the steering member 2 may be made larger than under the normal conditions.

It is also possible to send the abnormal alarming signals to only either one or two of the ECUs 33 to 35, or to send the abnormal alarming signal to another control unit which is provided on the vehicle. Alternatively, it is possible to send the abnormal alarming signal from the control section 24 so that a notice for recommending repair may be shown on a meter panel or the like of the vehicle.

It is possible to expedite the repair, by recommending the driver to rapidly repair by the above described repair expediting means, whereby occurrence of additional breakdown or accident due to neglected repair can be avoided.

Figure 2:
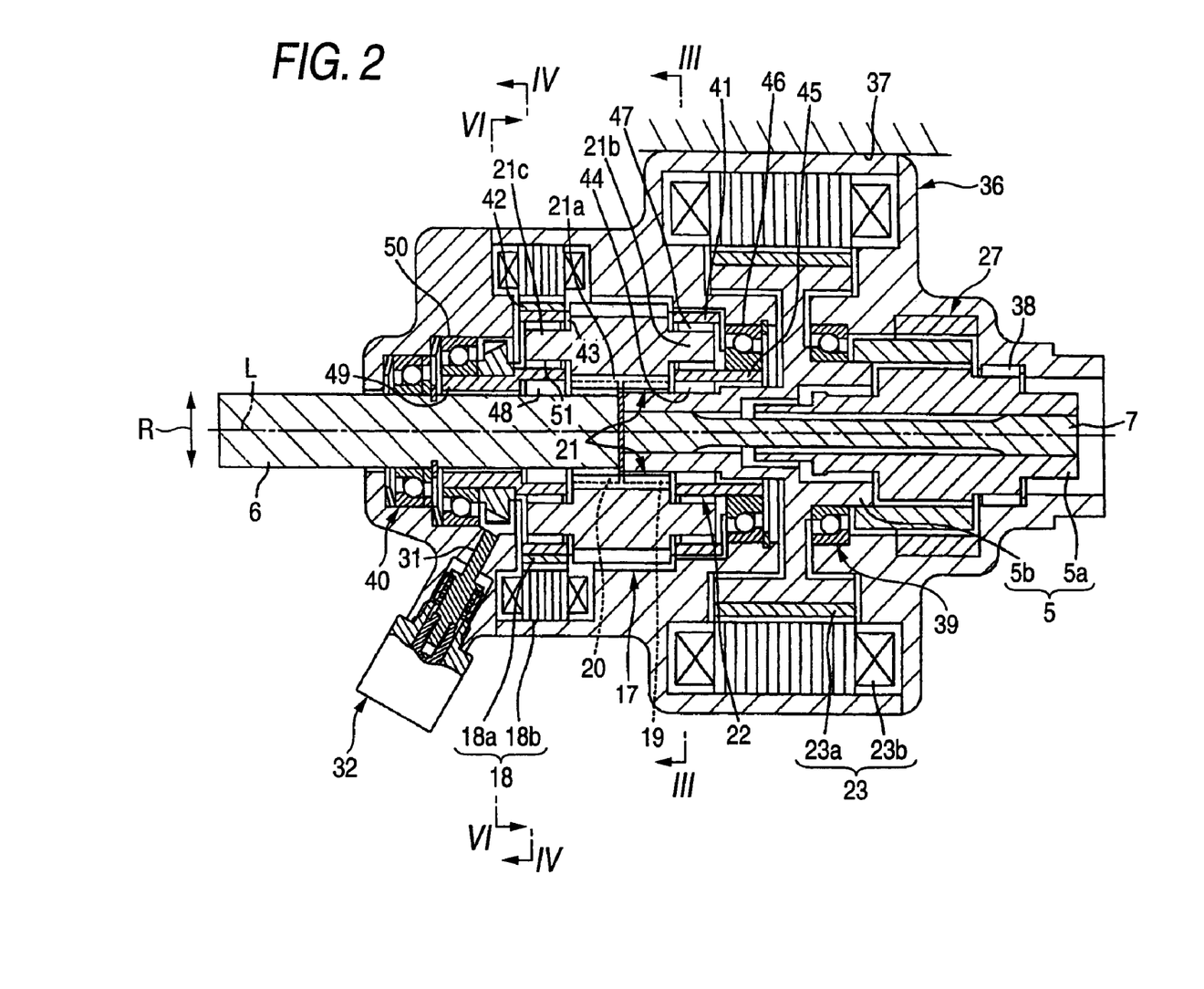
FIG. 2 is a sectional view of an essential part of FIG. 1.

FIG. 2 is a sectional view of an essential part in FIG. 1. Referring to FIG. 2, the planet gear mechanism 17 is contained in the housing 36. The housing 36 is a tubular member formed of aluminum alloy, for example, and supported by a vehicle body 37.

The input shaft 5a of the first shaft 5 is rotatably held in the housing 36 by means of a first bearing 38 composed of a roller bearing or the like. The output shaft 5b is rotatably held in the housing 36 by means of a second bearing 39 composed of a rolling bearing such as a single row angular ball bearing.

The rotor 23a of the reaction force compensating motor 23 is fixed to an outer peripheral face of the output shaft 5b at a middle part thereof. The stator 23b of the reaction force compensating motor 23 is fitted into and fixed to the housing 36.

A middle part of the second shaft 6 is rotatably held in the housing 36 by means of a third bearing 40 composed of a rolling bearing such as a single row angular ball bearing.

The first sun gear 19 of the planet gear mechanism 17 is integrally formed with the output shaft 5b of the first shaft 5 employing a single member, and positioned at one end of the output shaft 5b. The second sun gear 20 is integrally formed with the second shaft 6 employing a single member, and positioned at one end of the second shaft 6.

Each of the planet gears 21 has a tooth part 21a which is meshed with both the first and second sun gears 19, 20, and subsidiary shafts 21b, 21c which extend from respective ends of the tooth part 21a.

Figure 3:
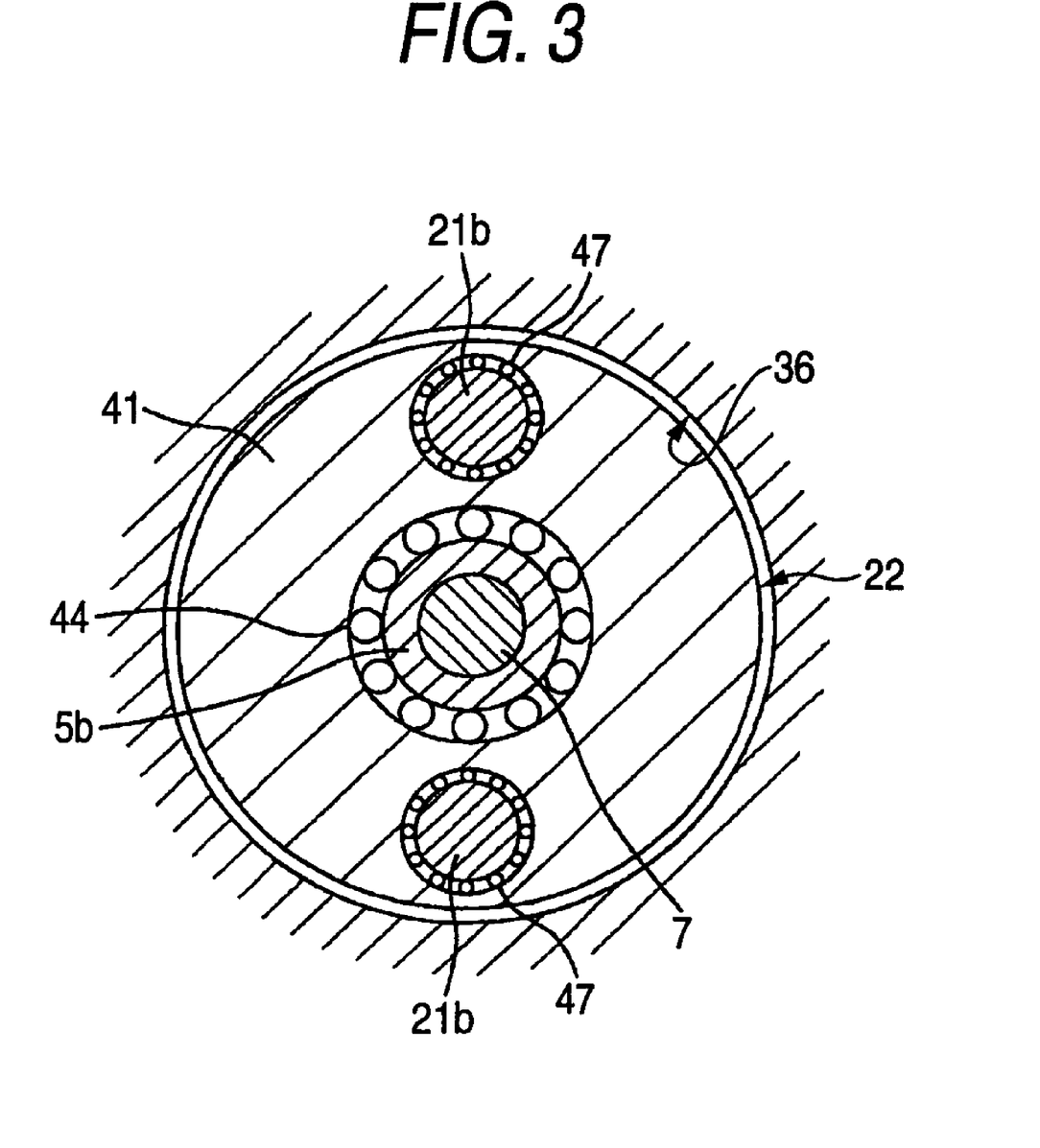
FIG. 3 is a sectional view taken along a line III-III in FIG. 2.

FIG. 3 is a sectional view taken along a line III-III in FIG. 2. Referring to FIGS. 2 and 3, the carrier 22 has one end part 41 for supporting the subsidiary shafts 21b of the planet gears 21 at one side thereof, the other end part 42 for supporting the subsidiary shafts 21c at the other side thereof, and an intermediate part 43 interconnecting the one end part 41 and the other end part 42.

The one end part 41 of the carrier 22 rotatably supports the output shaft 5b by means of a fourth bearing 44 composed of a rolling bearing such as a roller bearing. This one end part 41 is provided with a rib portion 45 in an annular shape which extends along an axial direction of the steering shaft 3. This rib portion 45 is rotatably held in the housing 36 by means of a fifth bearing 46 composed of a rolling bearing such as a single row angular ball bearing.

Moreover, the one end part 41 of the carrier 22 rotatably supports the respective subsidiary shafts 21b of the planet gears 21 by means of corresponding sixth bearings 47. Each of the sixth bearings 47 is composed of a roller bearing, for example.

Figure 4:
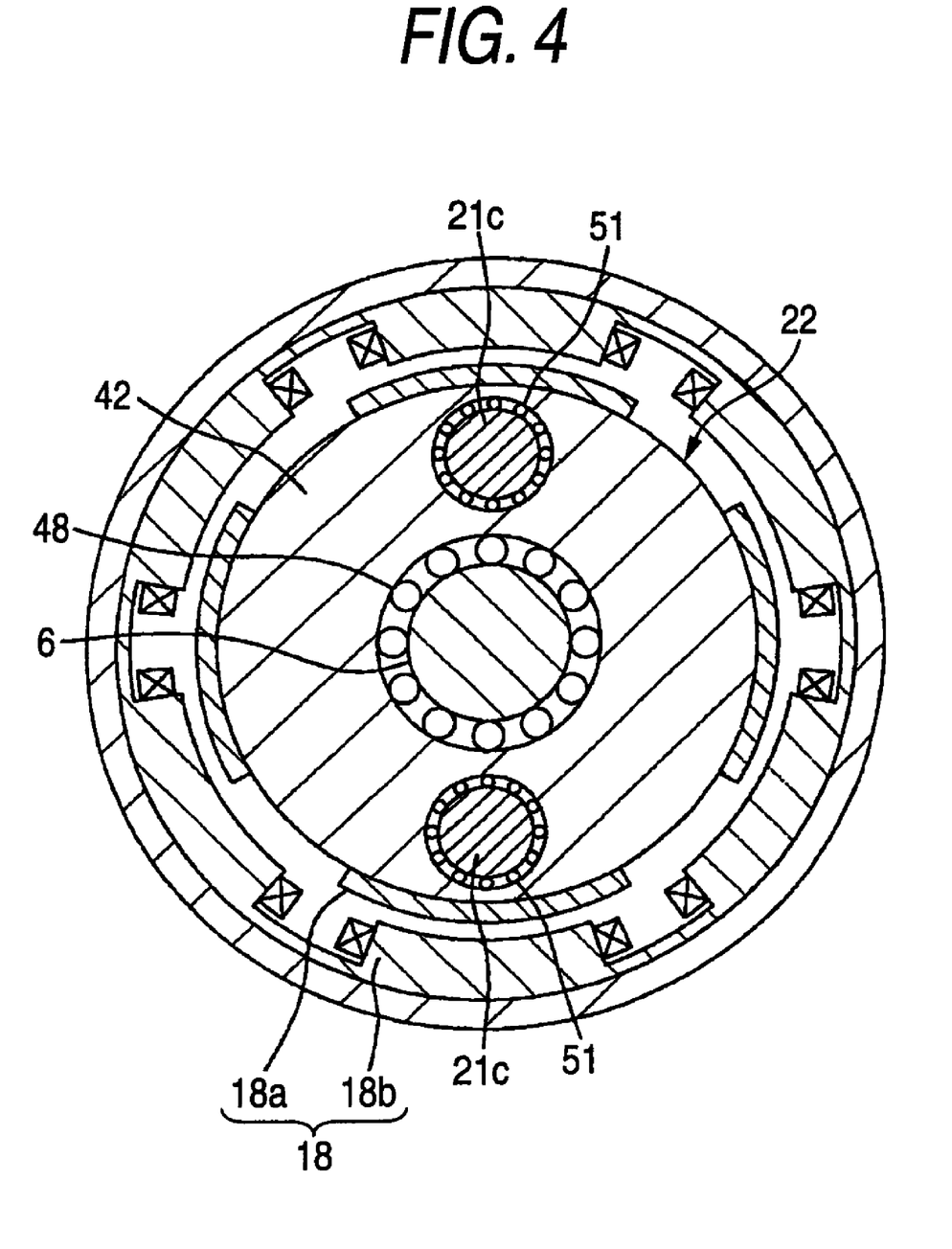
FIG. 4 is a sectional view taken along a line IV-IV in FIG. 2.

FIG. 4 is a sectional view taken along a line IV-IV in FIG. 2. Referring to FIGS. 2 and 4, the other end part 42 of the carrier 22 rotatably supports the second shaft 6 by means of a seventh bearing 48 composed of a rolling bearing such as a roller bearing. This other end part 42 is provided with a rib portion 49 in an annular shape which extends along the axial direction of the steering shaft 3. The rib portion 49 is rotatably held in the housing 36 by means of an eighth bearing 50 composed of a single row angular ball bearing or the like.

Moreover, the other end part 42 of the carrier 22 rotatably supports the respective subsidiary shafts 21c of the planet gears 21 by means of corresponding ninth bearings 51. Each of the ninth bearings 51 is composed of a roller bearing, for example. The intermediate part 43 of the carrier 22 is arranged in parallel with the respective tooth parts 21a of the planet gears 21 in a circumferential direction of the steering shaft 3, and interconnects the one end part 41 and the other end part 42 so as to integrally rotate.

The rotor 18a of the aforesaid motor 18 for the planet gear mechanism is fixed to an outer peripheral face of the other end part 42 of the carrier 22. The stator 18b of the motor 18 for the planet gear mechanism is fitted in and fixed to the housing 36. The electromagnetic solenoid 32 is arranged outward of the carrier 22 in a radial direction R.

Figure 5:
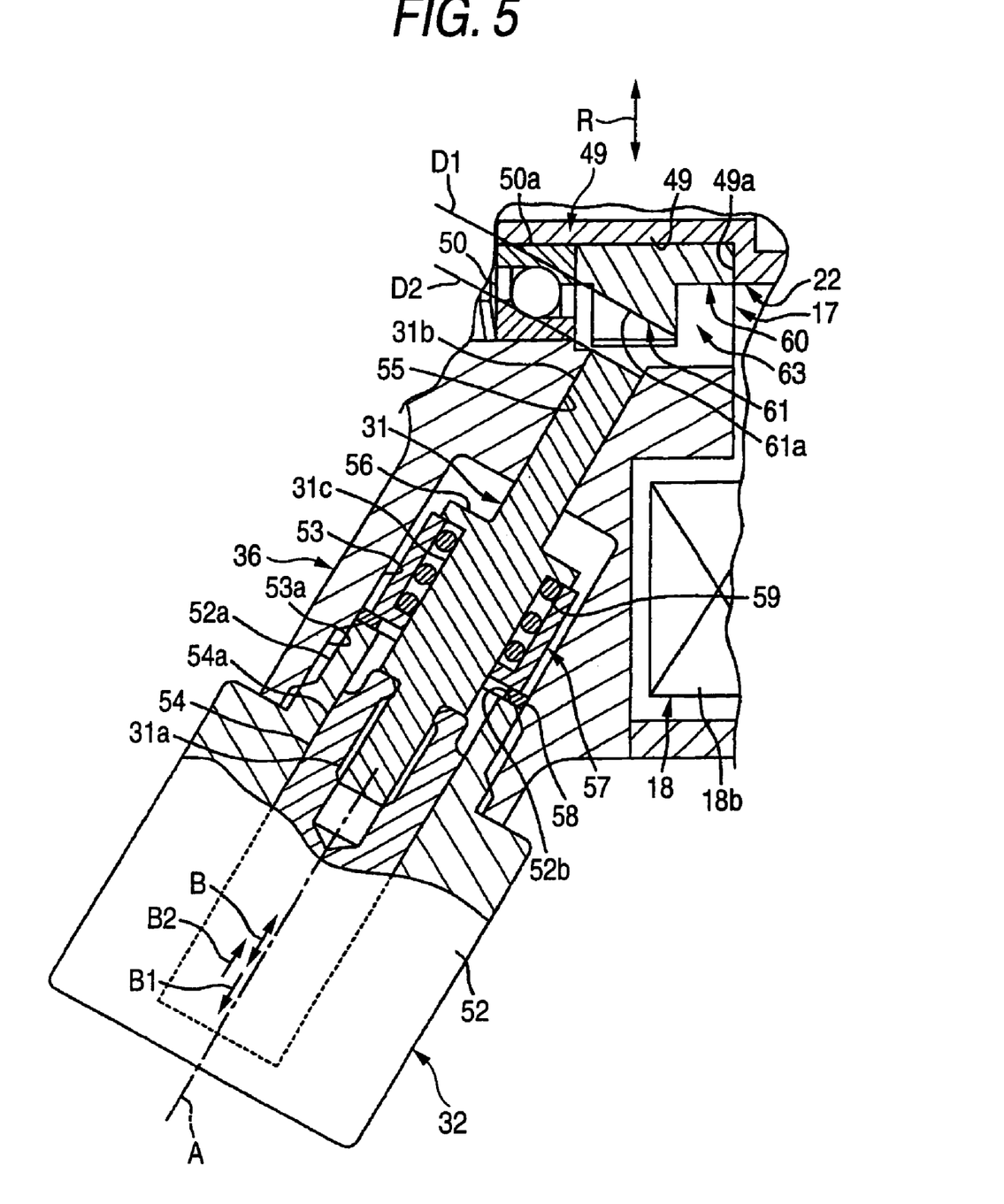
FIG. 5 is an enlarged sectional view of an essential part surrounding an electromagnetic solenoid in FIG. 2.
Figure 6:
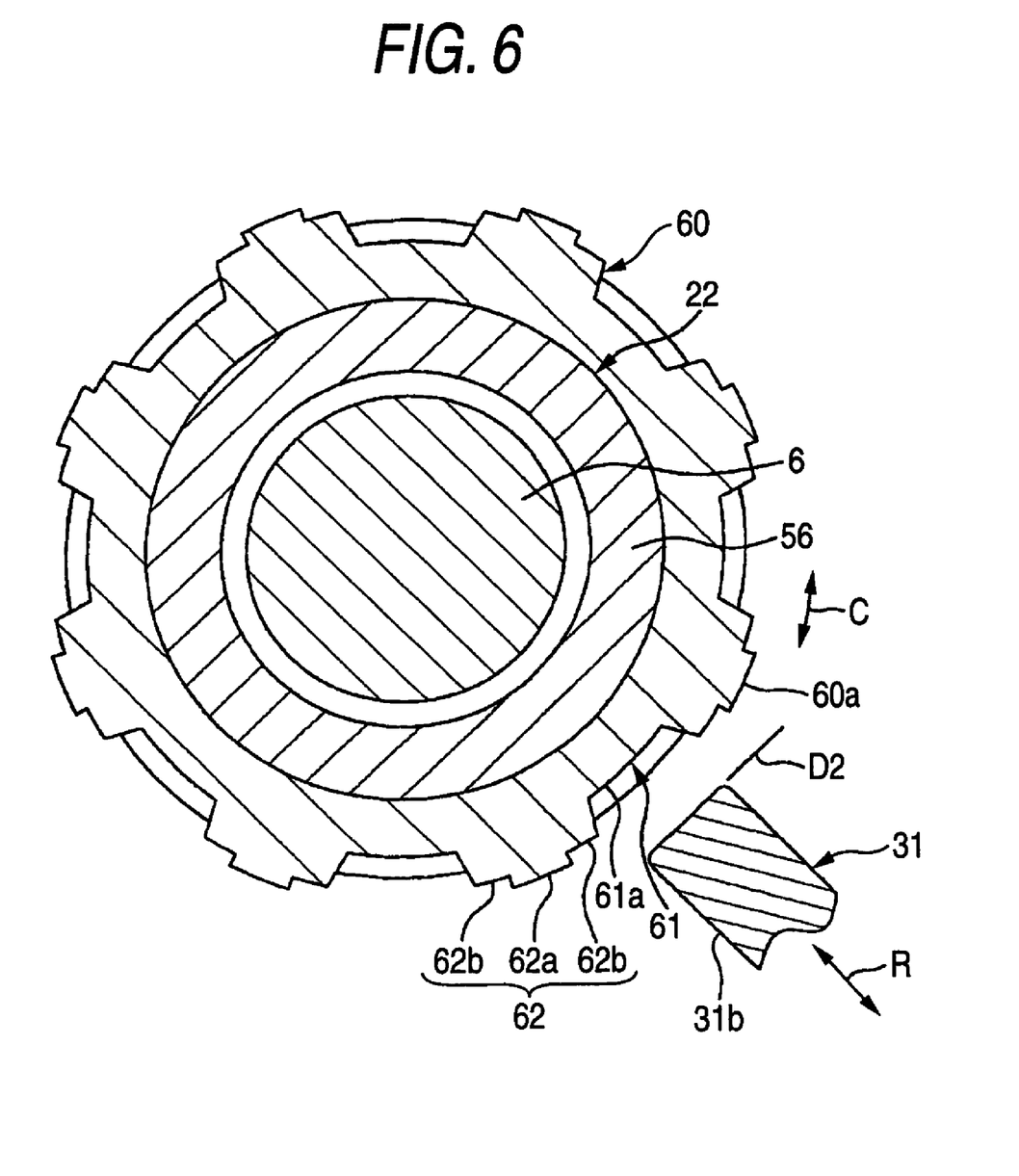
FIG. 6 is a sectional view of an essential part taken along a line VI-VI in FIG. 2.

FIG. 5 is an enlarged sectional view of an essential part surrounding the electromagnetic solenoid 32 in FIG. 2. FIG. 6 is a sectional view of an essential part taken along a line VI-VI in FIG. 2.

Referring to FIG. 5, the electromagnetic solenoid 32 includes a movable element 54 and a coil spring 59 as an urging member. A solenoid housing 52 of the electromagnetic solenoid 32 has a bottomed cylindrical shape. A hollow screw shaft 52a which is formed at one end of the solenoid housing 52 is screwed into a threaded bore 53a of a holding bore 53 in the housing 36 and fixed thereto. An axis A of the solenoid housing 52 is inclined with respect to the radial direction R of the carrier 22, and an opening end of the solenoid housing 52 is directed to the motor 18 for the planet gear mechanism.

A stator (not shown) and the movable element 54 are contained in the solenoid housing 52. By energizing the stator which is fixed to the solenoid housing 52, a driving force along the axial direction of the solenoid housing 52 is applied to the movable element 54. The movable element 54 is guided so as to move in a moving direction B along the axis A of the solenoid housing 52.

The restraining member 31 is formed of metal, for example, into a rod-like shape. It is to be noted that the restraining member 31 may be formed of synthetic resin. One end part 31a of the restraining member 31 is fixed to one end 54a of the movable element 54 of the electromagnetic solenoid 32 by screw fitting, so that the movable element 54 and the restraining member 31 can integrally move in the moving direction B.

The other end part 31b and an intermediate part 31c of the restraining member 31 is projected from the solenoid housing 52 and extended toward the carrier 22 of the planet gear mechanism 17. The other end part 31b of the restraining member 31 is passed through an insertion hole 55 communicating between the holding bore 53 and a space 63 in which the carrier 22 is contained, and opposed to the rib portion 49 of the carrier 22 in the radial direction R.

The intermediate part 31c of the restraining member 31 is provided with a rib portion 56 which is projected in a radial direction of the intermediate part 31c. The rib portion 56 is formed in an annular shape, for example, and adapted to be received by one end face of a cup member 57 in a bottomed tubular shape which is fitted to the intermediate part 31c. The other end face of the cup member 57 is received by one end face 52b of the solenoid housing 52 via a washer 58. The restraining member 31 is restrained from moving in a direction B1 of the moving direction B, when the cup member 57 receives the rib portion 56.

The coil spring 59 is idly fitted to the intermediate part 31c of the restraining member 31. The coil spring 59 is disposed between the other end of the cup member 57 and the rib portion 56 of the restraining member 31, and urges the restraining member 31 to the other direction B2 of the movable direction B, that is, toward the engaged position D1.

Under normal conditions, the driving force in the direction B1 of the moving direction B is applied to the restraining member 31 by the drive of the electromagnetic solenoid 32, and the rib portion 56 of the restraining member 31 is received by the cup member 57 against the urging force of the coil spring 59. On this occasion, the restraining member 31 is positioned at the disengaged position D2.

Referring to FIGS. 5 and 6, the ring member 60 is arranged adjacent to the eighth bearing 50, and fixed to an outer peripheral face of the annular rib portion 49 of the carrier 22 by press-fitting, for example. It is to be noted that the carrier 22 and the ring member 60 can be integrally formed of a single member.

This ring member 60 is opposed to the other end part 31b of the restraining member 31 in the radial direction R, and interposed between an inner ring 50a of the eighth bearing 50 and a stepped part 49a of the annular rib portion 49 of the carrier 22, so that the ring member 60 can be positioned in the axial direction. The inner ring 50a is fixed to the annular rib portion 49 by press-fitting, for example.

The ring member 60 is formed, on its outer peripheral face 60a, with a plurality of (in this embodiment, eight, for example) engaging recesses 61 which is engageable with the other end part 31*b* of the restraining member 31. The engaging recesses 61 are provided at equal distances in a circumferential direction C of the outer peripheral face 60*a*. By providing a plurality of the engaging recesses 61, it is possible to shorten pitches between the respective engaging recesses 61 in the circumferential direction C, and to increase the number of times when the engaging recesses 61 are opposed to the restraining member 31 per a unit time, while the carrier 22 rotates.

Each of the engaging recesses 61 includes a part which is formed in a taper shape in section, so as to become larger in width outward in the radial direction R, and accordingly, the restraining member 31 can be easily introduced into the engaging recess 61. A bottom face 61*a* of the engaging recess 61 extends in a direction intersecting an axis of the ring member 60, and opposed to an end face of the other end part 31*b* of the restraining member 31 in the direction of the axis A.

Guide parts 62 for guiding the restraining member 31 to be introduced into the engaging recesses 61 are formed on the outer peripheral face 60*a* of the ring member 60. The guide parts 62 are respectively arranged between the respective engaging recesses 61, and each of the guide parts 62 includes a crest part 62*a*, and stepped parts 62*b*, 62*b* which are arranged at both sides of the crest part 62*a* in the circumferential direction C of the outer peripheral face 60*a*. The stepped parts 62*b*, 62*b* of the guide part 62 are positioned back from the crest part 62*a* inward in the radial direction R, and respectively continued to the corresponding engaging recesses 61.

Although the number of steps of the stepped part 62*b* is one in this embodiment, a plurality of steps more than two may be provided. As the number of the steps increases, a profile of the outer peripheral face 60*a* from the crest part 62*a* up to the engaging recess 61 can be made smooth, whereby the restraining member 31 can be more smoothly guided into the engaging recess 61.

Referring to FIG. 1, in the steering device 1 for a vehicle having the above described structure, when the control section 24 detects occurrence of an abnormal condition, the control section 24 will interrupt supply of the electric power to the electromagnetic solenoid 32.

Consequently, the electromagnetic solenoid 32 stops generation of the driving force for actuating the restraining member 31 in the one direction B1 of the moving direction B, referring to FIG. 5, and moves the restraining member 31 in the other direction B2 of the moving direction B (toward the engaged position D1) by the urging force of the coil spring 59.

Figure 7A:
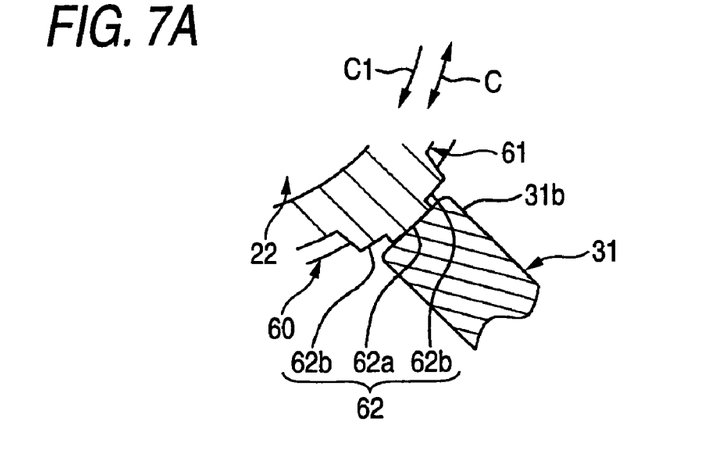
FIGS. 7A, 7B, and 7C are sectional views for explaining operations by which rotation of a carrier is restrained.
Figure 7B:
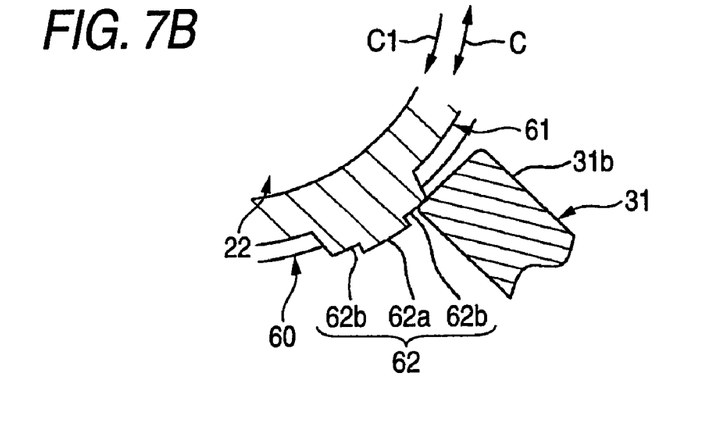
Figure 7C:
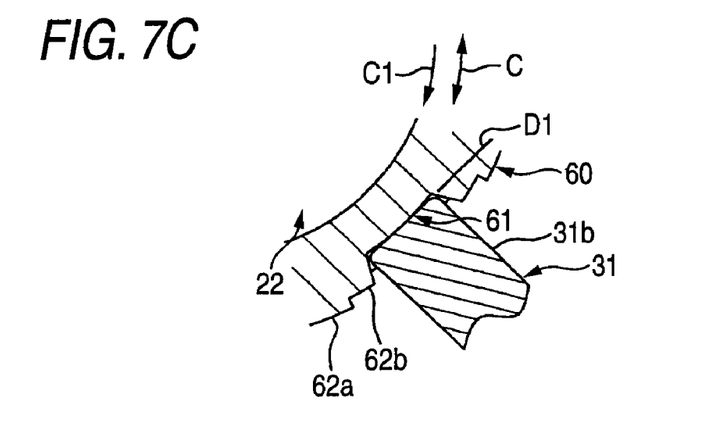

On this occasion, the end face of the other end part 31*b* of the restraining member 31 comes into contact with the crest part 62*a* of the guide part 62 of the ring member 60, as shown in FIG. 7A. The end face of the other end part 31*b* which has come into contact with the crest part 62*a* of the guide part 62 is brought into contact with the stepped part 62*b* of the guide part 62 along with the rotation of the ring member 60 in one direction C1 of the circumferential direction C, as shown in FIG. 7B, whereby the movement of the other end part 31*b* is guided. Then, the other end part 31*b* of the restraining member 31 is engaged with the engaging recess 61, as shown in FIG. 7C, whereby the rotations of the ring member 60 and the carrier 22 are restrained.

When the ring member 60 rotates in the other direction of the circumferential direction C, the other end part 31*b* of the restraining member 31 is also engaged with the engaging recess 61, in the same manner as described above, whereby the rotations of the ring member 60 and the carrier 22 are restrained.

As has been described herein above, according to this embodiment, the following operation and effects can be achieved. Specifically, in the structure where the speed reducing mechanism is not provided between the motor 18 for the planet gear mechanism and the planet gear mechanism 17, it is possible to fix the transmission ratio θ2/θ1 under the abnormal conditions, by restraining the rotation of the ring member 60 thereby to restrain the rotation of the carrier 22.

Moreover, because the restraining member 31 restrains the rotation of the carrier 22 which is integrally rotated with the rotor 18*a* having a small transmission torque in spite of high speed rotation, the force required for the restraint can be made smaller. As the results, the load exerted on the restraining member 31, on occasion of fixing the transmission ratio θ2/θ1, can be reduced, and the restraining member 31 can be made compact.

Further, in the planet gear mechanism 17, the carrier 22 and the ring member 60 which rotate at high speed are formed relatively large in diameter. Therefore, it is possible to provide a number of positions in which the restraining member 31 is engageable with the ring member 60 (the engaging recesses 61) during one rotation of the ring member 60. As the results, it is possible to fix the transmission ratio θ2/θ1 with high responding ability, when an abnormal condition has occurred.

Moreover, it is possible to vary the transmission ratio θ2/θ1, by rotating the rotor 18*a* and the carrier 22 at high speed with the rotation number as large as ten times of the rotation number of the first sun gear 19, for example. When the transmission ratio θ2/θ1 is fixed by the restraining member 31, the restraining member 31 restrains the carrier 22 which is integrally rotated with the rotor 18*a* having a small load though rotating at high speed. Therefore, the load applied to the restraining member 31 is small, and hence, the restraining member 31 can be made compact.

Further, by moving the restraining member 31 from the disengaged position D2 to the engaged position D1 by means of the electromagnetic solenoid 32, it is possible to restrain the rotation of the carrier 22.

Moreover, the restraining member 31 is adapted to be engaged with the engaging recesses 61 which are formed on the outer peripheral face 60*a* of the ring member 60. In this manner, the ring member 60 and the restraining member 31 can be reliably engaged with each other, so that the ring member 60 may not move relative to the restraining member 31.

Further, a plurality of the engaging recesses 61 are arranged on the outer peripheral face 60*a* of the ring member 60 at equal intervals in the circumferential direction C. In case where the carrier 22 rotates, the number of times when the engaging recesses 61 are opposed to the restraining member 31 can be increased. Consequently, when the restraining member 31 is engaged with one of the engaging recesses 61, a time lag until they start to be engaged can be shortened.

Still further, the rotor 18*a* of the motor 18 for the planet gear mechanism is coaxially arranged with the steering shaft 3. As the results, an amount of projection of the motor 18 for the planet gear mechanism in the radial direction of the steering shaft 3 can be made smaller, and hence, the steering device 1 for a vehicle can be made compact. Further, because there is no speed reducing mechanism between the planet gear mechanism 17 and the motor 18 for the planet gear mechanism, the number of components can be reduced, and hence, it is possible to reduce the cost.

Still further, the solenoid housing 52 of the electromagnetic solenoid 32 is inclined with respect to the radial direction R of the carrier 22. Consequently, the solenoid housing 52 can be arranged close to the surrounding members (for example, the motor 18 for the planet gear mechanism), while interference between them is avoided. As the results, an overall length of the steering device 1 for a vehicle can be made shorter.

Still further, the electromagnetic solenoid 32 and the restraining member 31 are arranged at a side of the second shaft 6 which is far from the steering shaft 2. Specifically, the electromagnetic solenoid 32 and the restraining member 31 are arranged in a place having an ample space for arrangement, as compared with a place having a narrow space for arrangement near the steering shaft 2. As the results, it is possible to enhance freeness in layout.

The invention is not limited to contents of the above described embodiment, but various modifications can be made within a scope of the claims.

For example, the restraining member 31 may be directly engaged with the carrier 22, omitting the ring member 60. Alternatively, the restraining member 31 may be engaged with the carrier 22 by moving it in the axial direction of the carrier 22. It is also possible to arrange the restraining member 31 in parallel with the radial direction R of the carrier 22. Further, as the actuator, other mechanisms such as a hydraulic cylinder, a cam mechanism may be used. Moreover, as the planet transmitting mechanism, a traction drive mechanism employing rollers in place of the gears of the planet gear mechanism 17 may be used.

What is claimed is:

1. A steering device for a vehicle, comprising:
a transmission ratio variable mechanism which can mechanically vary a transmission ratio between a steering angle of a steering member and a turning angle of turning wheels,
an electric motor including a rotor which can rotate integrally with a determined element in an annular shape of said transmission ratio variable mechanism, and provided for varying the transmission ratio,
a controller connected and adapted to control said electric motor to vary the transmission ratio between the steering angle of the steering member and the turning angle of turning wheels, and
a lock mechanism for fixing said transmission ratio when an abnormal condition has occurred,
wherein said lock mechanism includes a restraining member which is engageable with said determined element or an annular member which is integrally rotated with said determined element, whereby rotation of said determined element can be restrained, wherein said transmission ratio variable mechanism includes a first sun gear connected to the steering member, a second sun gear having an axis corresponding to an axis of the first sun gear and connected to the turning wheels, a planet gear which is meshed with the first and second sun gears, and a carrier in an annular shape which supports the planet gear so as to rotate on an axis thereof and so as to revolve around the axis of the first and second sun gears integrally, wherein said determined element includes said carrier.

2. A steering device for a vehicle as claimed in claim 1, wherein said lock mechanism includes an actuator which can displace said restraining member between an engaged position in which said restraining member is engaged with said determined element or said annular member and a disengaged position in which the engagement is released.

3. A steering device for a vehicle as claimed in claim 1, wherein said determined element or said annular member is provided with a recess which is formed on an outer peripheral face thereof and is engageable with said restraining member.

4. A steering device for a vehicle as claimed in claim 3, wherein a plurality of said recesses are arranged at equal intervals in a circumferential direction on the outer peripheral face of said determined element or said annular member.

5. A steering device for a vehicle, comprising:
transmission ratio variable means for mechanically varying a transmission ratio between a steering angle of a steering member and a turning angle of turning wheels,
an electric motor including a rotor which can rotate integrally with a determined element in an annular shape of said transmission ratio variable means, and provided for varying the transmission ratio,
control means for controlling said electric motor to vary the transmission ratio between the steering angle of the steering member and the turning angle of turning wheels, and
a lock mechanism for fixing said transmission ratio when an abnormal condition has occurred,
wherein said lock mechanism includes a restraining member which is engageable with said determined element or an annular member which is integrally rotated with said determined element, whereby rotation of said determined element can be restrained, wherein said transmission ratio variable means includes a first sun gear connected to the steering member, a second sun gear having an axis corresponding to an axis of the first sun gear and connected to the turning wheels, a planet gear which is meshed with the first and second sun gears, and a carrier in an annular shape which supports the planet gear so as to rotate on an axis thereof and so as to revolve around the axis of the first and second sun gears integrally, wherein said determined element includes said carrier.

6. A steering device for a vehicle as claimed in claim 5, wherein said lock mechanism includes an actuator which can displace said restraining member between an engaged position in which said restraining member is engaged with said determined element or said annular member and a disengaged position in which the engagement is released.

7. A steering device for a vehicle as claimed in claim 5, wherein said determined element or said annular member is provided with a recess which is formed on an outer peripheral face thereof and is engageable with said restraining member.

8. A steering device for a vehicle as claimed in claim 7, wherein a plurality of said recesses are arranged at equal intervals in a circumferential direction on the outer peripheral face of said determined element or said annular member.

* * * * *